(12) United States Patent
Nieuwenhuis et al.

(10) Patent No.: US 11,480,816 B2
(45) Date of Patent: Oct. 25, 2022

(54) COMPUTER-IMPLEMENTED METHOD FOR DETERMINING CENTRATION PARAMETERS

(71) Applicants: Carl Zeiss Vision International GmbH, Aalen (DE); Carl Zeiss AG, Oberkochen (DE)

(72) Inventors: Claudia Nieuwenhuis, Aalen (DE); Oliver Schwarz, Ellwangen (DE)

(73) Assignees: Carl Zeiss Vision International GmbH, Aalen (DE); Carl Zeiss AG, Oberkochen (DE)

( * ) Notice: Subject to any disclaimer, the term of this patent is extended or adjusted under 35 U.S.C. 154(b) by 0 days.

(21) Appl. No.: 17/105,980

(22) Filed: Nov. 27, 2020

(65) Prior Publication Data

US 2021/0080758 A1    Mar. 18, 2021

Related U.S. Application Data

(63) Continuation of application No. 16/519,562, filed on Jul. 23, 2019, now abandoned, which is a
(Continued)

(30) Foreign Application Priority Data

Jan. 27, 2017    (EP) .................................. 17153559

(51) Int. Cl.
*G02C 13/00* (2006.01)
*G06T 7/50* (2017.01)
(Continued)

(52) U.S. Cl.
CPC .............. *G02C 13/005* (2013.01); *G06T 7/50* (2017.01); *G06T 7/60* (2013.01); *G06T 7/70* (2017.01);
(Continued)

(58) Field of Classification Search
CPC ........... G02C 13/005; G06T 7/50; G06T 7/97; G06T 7/60; G06T 2207/30201; H04N 5/2256; H04N 5/247
See application file for complete search history.

(56) References Cited

U.S. PATENT DOCUMENTS 4,465,348 A    8/1984 Lang et al.
5,592,248 A    1/1997 Norton et al.
(Continued)

FOREIGN PATENT DOCUMENTS

CN    105026989 A    11/2015
DE    102009004383 A1    7/2009
(Continued)

OTHER PUBLICATIONS

Result of Consultation by the European Patent Office issued in EP 18 703 706.4, which is a counterpart hereof, dated Jul. 21, 2020, and English-language machine translation thereof.
(Continued)

*Primary Examiner* — Michael E Teitelbaum
(74) *Attorney, Agent, or Firm* — Tautz & Schuhmacher LLC; Georg Hasselmann

(57) ABSTRACT

Centration parameters for fitting spectacle lenses to a predetermined spectacle frame and to the head of a subject are determined with a computer-implemented method. At least two calibrated images, recorded from different recording directions, of the head of the subject wearing the spectacle frame are provided, wherein geometric parameters are established by geometric position determination. The geometric parameters describe the position of the eyes and the geometry of the spectacle frame, and the centration parameters are calculated from the geometric parameters. Further, a three-dimensional model for the spectacle lenses, which are to be received in the spectacle frame, is fitted to the geometry of
(Continued)

the geometric parameters that describe the geometry of the spectacle frame.

28 Claims, 7 Drawing Sheets

Related U.S. Application Data continuation of application No. PCT/EP2018/051841, filed on Jan. 25, 2018.

(51) Int. Cl.
| | |
|---|---|
| *G06T 7/00* | (2017.01) |
| *G06T 7/70* | (2017.01) |
| *G06T 7/60* | (2017.01) |
| *H04N 5/225* | (2006.01) |
| *H04N 5/247* | (2006.01) |

(52) U.S. Cl.
CPC .............. *G06T 7/97* (2017.01); *H04N 5/2256* (2013.01); *H04N 5/247* (2013.01); *G06T 2207/30201* (2013.01)

(56) References Cited

U.S. PATENT DOCUMENTS

| | | |
|---|---|---|
| 9,262,695 B2 | 2/2016 | Choukroun et al. |
| 10,216,010 B2 | 2/2019 | Tiemann et al. |
| 2003/0081173 A1 | 5/2003 | Dreher |
| 2003/0123026 A1 | 7/2003 | Abitbol et al. |
| 2007/0195266 A1 | 8/2007 | Kubitza |
| 2009/0021693 A1 | 1/2009 | Sessner et al. |
| 2011/0007269 A1 | 1/2011 | Trumm et al. |
| 2014/0253875 A1 | 9/2014 | Le Gallou et al. |
| 2015/0015848 A1 | 1/2015 | Haddadi et al. |
| 2015/0304530 A1 | 10/2015 | Courteille et al. |
| 2016/0026001 A1 | 1/2016 | Nishimura et al. |
| 2019/0346698 A1 | 11/2019 | Nieuwenhuis et al. |

FOREIGN PATENT DOCUMENTS

| | | |
|---|---|---|
| DE | 102008012268 A1 | 9/2009 |
| DE | 102011115239 A1 | 3/2013 |
| FR | 2987908 A1 | 9/2013 |
| JP | 2007206211 A | 8/2007 |
| WO | 2012113805 A1 | 8/2012 |
| WO | 2015101737 A1 | 7/2015 |
| WO | 2016026570 A1 | 2/2016 |

OTHER PUBLICATIONS

Decision to Grant by the European Patent Office issued in EP 18 703 706.4, which is a counterpart hereof, dated Feb. 25, 2021, and English-language translation thereof.
DIN EN ISO 13666 (Ophthalmic optics—Spectacle lenses), dated Oct. 2013.
Hartley et al.: "Multiple View Geometry in Computer Vision," 2nd edition, pp. 1 to 8, Cambridge University Press 2004.
Ullman et al. "Recognition by Linear Combinations of Models" IEEE Transactions on Pattern Analysis and Machine Intelligence, vol. 13, No. 10, Oct. 1991.
Extended European Search Report issued in EP 17153559.4, which is a counterpart hereof, dated Jul. 20, 2017.
International search report issued in international application PCT/EP2018/051841, which is a counterpart hereof, dated May 3, 2018, and English-language translation thereof.
International preliminary examination report issued in international application PCT/EP2018/051841, which is a counterpart hereof, dated May 6, 2019, and English-language translation thereof.
English-language translation of an Office action by the Chinese Patent Office issued in CN 201880008680.8, which is a counterpart hereof, dated Mar. 9, 2020.
Office action by the European Patent Office in EP 18 703 706.4, which is a counterpart hereof, dated Jul. 21, 2020, and English-language translation thereof.
Collins et al., "Maße und optische Daten [Dimensions and optical data]," Excerpt from Augenheilkunde [Ophthalmology], chapter 41, pp. 876 to 877, Springer-Verlag Berlin Heidelberg, 1997, and English-language machine translation thereof.
Jing et al., "Glasses Detection and Extraction by Deformable Contour," Proceedings 15th International Conference on Pattern Recognition, 2000.
Industrial Norm DIN EN ISO 8624, "Augenoptik—Brillenfassungen [Ophthalmic Optics—Spectacle Frames]," Deutsches Institut fur Normung, Jun. 2002, and English-language machine translation thereof.
Sessner, "ImpressionIST—Das4-in-1 Integrierte Service-Terminal von Rodenstock [ImpressionIST—The 4-in-1 Integrated service terminal from Rodenstock]," DOZ Optometrie & Fashion, vol. 1, Jan. 13, 2006, and English-language machine translation thereof.
Sessner, "3D-Videozentriersystem zur hochgenauen Vermessung der Zentrierdaten und individueller Parameter des Systems Brille Auge [3D video centering system to the highly accurate measurement the centering data and more individual parameter of systems glasses eye]," DGaO-Proceedings, 2007, and English-language machine translation thereof.
Urthaler: "Glasses Detection and Segmentation from Face Portrait Images," Master's Thesis, Graz University of Technology, Dec. 2008.
Inventory stamp for Urthaler: "Glasses Detection and Segmentation from Face Portrait Images," dated May 29, 2009.
Library online catalog entry for Urthaler: "Glasses Detection and Segmentation from Face Portrait Images," dated Dec. 16, 2019, and English-language machine translation thereof.
Wesemann, "Moderne Videozentriersysteme und Pupillometer im Vergleich [Comparison of modern video centration systems and pupillometers]," DOZ Optometrie & Fashion Jun. 2009, Jun. 2, 2009, and English-language machine translation thereof.
Instruction manual "ImpressionIST 3" copyright 2012, and English-language machine translation thereof.
Screenshot of update server for "ImpressionIST 3," dated Dec. 12, 2011.
Delivery slip for "ImpressionIST 3," dated Nov. 6, 2012 and English-language machine translation thereof.
Declaration by Mr. Kolokotronis concerning the public availability of "ImpressionIST 3," dated Dec. 22, 2021, and English-language machine translation thereof.
Borza et al., "Eyeglasses Lens Contour Extraction from Facial Images Using an Efficient Shape Description," Sensors, Oct. 10, 2013.
Tiemann et al., "The Next Generation 3D Vision System for Measuring the Individual Parameters of Spectacle Wearers" DGaO Proceedings, 2014.
Opposition against European patent EP 3574371, dated Jan. 5, 2022, and English-language machine translation thereof.
Office action by the European Patent Office issued in EP17153 559.4, which is a counterpart hereof, dated Jun. 15, 2022, and English-language machine translation thereof.

COMPUTER-IMPLEMENTED METHOD FOR DETERMINING CENTRATION PARAMETERS

CROSS REFERENCE TO RELATED APPLICATIONS

This application is a continuation application of U.S. patent application Ser. No. 16/519,562, filed Jul. 23, 2019, now U.S. patent application publication 2019/0346698 A1, which is a continuation application of international patent application PCT/EP2018/051841, filed Jan. 25, 2018, which claims priority to European patent application EP 17153559.4, filed on Jan. 27, 2017, all of which are hereby incorporated by reference in their entireties.

TECHNICAL FIELD

The disclosure relates to a computer-implemented method for determining centration parameters, in particular for fitting spectacle lenses to a given spectacle frame and to the head of the subject, and/or for centring spectacle lenses, wherein at least two images of the head of the subject wearing a spectacle frame, which are calibrated to one another and recorded from different recording directions, are provided.

BACKGROUND

Centration parameters are used to correctly arrange or centre spectacle lenses in a spectacle frame, such that the spectacle lenses are arranged at the correct position relative to the eyes of the spectacles-wearing person. Here, these are in part anatomical parameters of the relevant person such as the interpupillary distance, in part purely frame-specific parameters such as the frame disk width or the frame disc height and in part combinations of anatomical and frame-specific parameters, such as the vertex distance and the fitting point height. An overview of conventional centration parameters is provided in DIN EN ISO 13666, dated October 2013.

Uncalibrated images are recorded in known methods for determining centration parameters, with a measuring frame having to be fastened to the spectacles or the spectacle frame. This is cumbersome and irritating. Further, US 2003/0123026 A1 discloses an apparatus of the type set forth at the outset, which automatically calculates centration parameters from images. In the known method, the spectacles are tried on virtually. This assumes that the parameters describing the geometry of the spectacle frame are known in advance.

SUMMARY

It is an object of the disclosure to develop a computer-implemented method of the type set forth at the outset in such a way that it is easier to carry out.

According to the disclosure, this object is achieved by a computer-implemented method wherein a three-dimensional model for the spectacle lenses to be received in the spectacle frame is fitted to the geometric parameters describing the geometry of the spectacle frame. In particular, planes or linear combinations of surfaces of n-th order are fitted to the parameters describing the geometry of the spectacle frame as an approximation for the surfaces of the spectacle lenses to be received in the spectacle frame and centration parameters are calculated from the geometric parameters describing the position of the eyes from the geometric parameters describing the geometry of the spectacle frame and from the three-dimensional model.

The disclosure is based on the concept of providing a simplified model for the spectacle lenses to be received in the spectacle frame by virtue of parameters describing the geometry of the spectacle frame and, in particular, parameters describing nasal and/or temporal frame edges being ascertained and the model for the spectacle lenses being fitted to these parameters. The frame edges can be approximated by straight lines.

In the process, provision is made of calibrated images. The calibration thereof comprises the extrinsic properties of the cameras recording the images or the camera recording the images in succession, such as the relative alignment of their optical axes and the relative alignment with respect to one another in space, and their intrinsic properties, i.e., the properties of the cameras themselves, which define how a point in space, which is situated in the internal coordinate system of the respective camera, is mapped onto the coordinates of the pixels of the recorded image. A detailed description of the calibration of cameras is found in the textbook entitled "Multiple View Geometry in Computer Vision" by Richard Hartley and Andrew Zisserman, 2nd edition, Cambridge University Press 2004, and, in particular, on page 8 therein. Geometric position determination is used to ascertain not only geometric parameters describing the position of the eyes from the images but also geometric parameters describing the geometry of the spectacle frame. Moreover, a three-dimensional model for the spectacle lenses to be received in the spectacle frame is fitted to the geometric parameters describing the geometry of the spectacle frame. The geometric parameters describing the position of the eyes, the geometric parameters describing the geometry of the spectacle frame and the three-dimensional model are used, as alternatives to one another or in combination, for the purposes of calculating the centration parameters.

An exemplary embodiment of the method provides for planes or linear combinations of surfaces of n-th order, in particular of at least one plane and/or at least one paraboloid, to be fitted to the parameters describing the nasal and/or temporal frame edges as an approximation for the surfaces of the spectacle lenses to be received in the spectacle frame. This represents a simplification of the model, which is easier to calculate. Expediently, the parameters describing the nasal and temporal frame edges are ascertained by means of epipolar geometry and/or by means of triangulation. Here, it is typical for at least three calibrated images of the head, which are recorded at the same time from different recording directions, to be provided, with a frontal image imaging the head from the front and a lateral image in each case imaging the head from the left and from the right. The recording directions of the lateral images each expediently include an angle of at least 60 degrees, e.g., 90°±10°, with the recording direction of the frontal image. The frontal and lateral images need not overlap in the method according to the disclosure. Regions of the images possibly overlapping with one another are expediently not used for determining the centration parameters.

According to an exemplary embodiment, provision is made for the geometric parameters describing the position of the eyes to include the position of the corneal vertex in space.

According to an exemplary embodiment of the disclosure, the position of the corneal vertex in space, determined to a first approximation, is subjected to a correction calculation.

The type of correction calculation then depends on the way in which the position of the corneal vertex in space is determined to the first approximation.

It is possible within the scope of a so-called pupil-based evaluation for the position of the corneal vertex in space to be determined to a first approximation as a point of intersection of a view ray, tangential to the cornea, from a lateral camera recording the lateral image with a view ray, directed onto the pupil, from a frontal camera recording the frontal image. If this is the case, the position of the corneal vertex is typically calculated according to the formula $a=q+\mu^*v+\mu^*w$ by means of the correction calculation, where a denotes the position vector of the corneal vertex in space after carrying out the correction calculation, q denotes the position of the corneal vertex to a first approximation, $\mu$ denotes an empirical value for the distance between the pupil centre and the corneal vertex, v denotes a unit vector in the spatial direction from the pupil centre to the frontal camera, and w denotes a unit vector in the recording direction extending through the centre of a corneal sphere.

Alternatively, it is also possible to undertake a reflection-based evaluation by virtue of a flash being produced, typically by means of an LED, when recording the images, wherein the position of the corneal vertex in space is determined to a first approximation as the position of the reflection point of the flash on the cornea. Proceeding from this first approximation, the position of the corneal vertex in the horizontal direction proceeding from the reflection point can typically be calculated with the correction calculation by adding $\Delta x=+/-r^*\sin(\frac{1}{2}^*(\arccos z/a+\arctan x/(z-v)))$ to the x-coordinate when the flash is produced by a light source arranged centrally in front of the face of the subject, where r denotes an empirical value for the corneal radius, a denotes the distance between the optical centre of a frontal camera recording the frontal image and the reflection point, x and z denote the x- and z-coordinates of the reflection point in a coordinate system with the origin at the optical centre of the frontal camera, wherein the recording direction of the frontal camera corresponds to the z-direction and the x-direction is horizontally orthogonal to the z-direction and, when observed in the z-direction, points to the right, and v denotes the distance between the light source producing the flash and the optical centre of the frontal camera in the z-direction. In addition or as an alternative thereto, the position of the corneal vertex in the y-direction proceeding from the reflection point can typically be calculated by means of the correction calculation by adding $\Delta y=+/-r^*\sin \frac{1}{2}^*(\arctan 1/(d-v))$, where r denotes an empirical value for the corneal radius, d denotes the distance between the optical centre of the frontal camera and the reflection point, v denotes the distance between the light source producing the flash and the optical centre of the frontal camera in the z-direction and l denotes the distance between the light source and the optical centre of the frontal camera in the y-direction, wherein the y-direction is orthogonal to the x-direction and to the z-direction and points upward in space.

Here, the plus sign in the x-direction should be applied when the corneal vertex of the left eye from the view of the subject is detected; the minus sign should be applied to the right eye from the view of the subject. In the y-direction, the plus sign should be applied when the light source emitting the flash is positioned at a lower height than the frontal camera; the minus sign should be applied when it is assembled at a greater height.

Typically, the pupil or the reflection point is detected by means of feature extraction and/or feature matching (feature comparison) and/or by means of machine learning by comparison with a multiplicity of data known in advance. This method step may be preceded by a face detection and/or a detection of facial features such as the eyes as a preprocessing step, in which there is a detection in respect of which image data belong to the face of the subject such that only these data are included in the detection.

In order to be able to undertake the determination of the corneal vertex in space for both eyes, it is common if provision is made of at least one calibrated third image that is recorded from a lateral position in respect of the head at the same time as the first image and the second image.

Typically, the computer-implemented method according to the disclosure is carried out using an apparatus for calculating the position of the corneal vertex as described in detail below.

The centration parameters, determined according to the disclosure, may typically be used for centring a spectacle lens in a spectacle frame and/or for grinding a spectacle lens into a spectacle frame. Here, in one method step, the at least one spectacle lens is centred in the spectacle frame using the centration parameters determined or the at least one spectacle lens is ground on the basis of the determined centration parameters for an arrangement in the spectacle frame. In this way, it is possible to produce spectacle lenses and spectacles.

BRIEF DESCRIPTION OF THE DRAWINGS

The disclosure will now be described with reference to the drawings wherein.

DESCRIPTION OF EXEMPLARY EMBODIMENTS

Figure 1A:
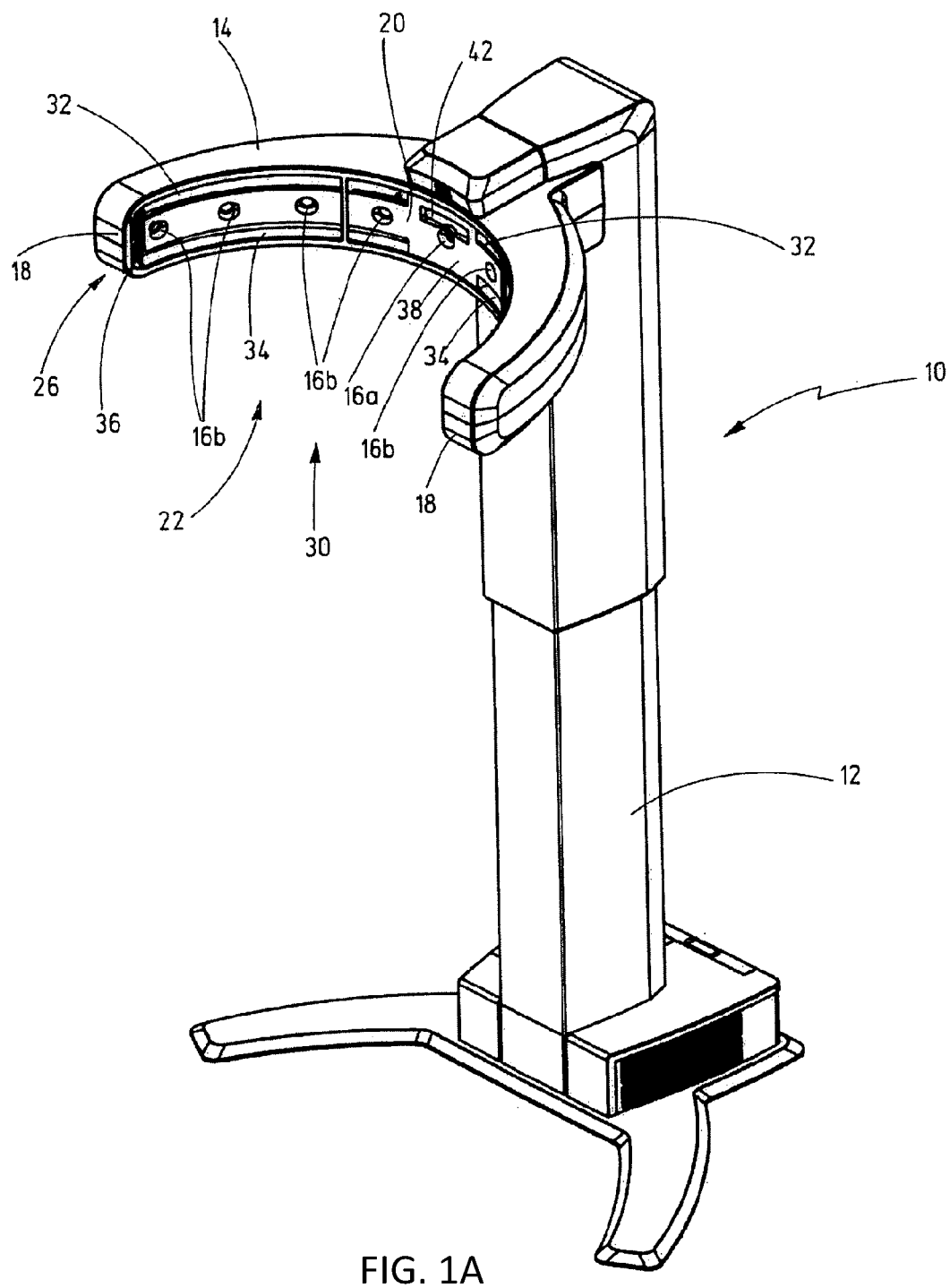
FIG. 1A shows an apparatus for determining centration parameters in a perspective view.
Figure 1B:
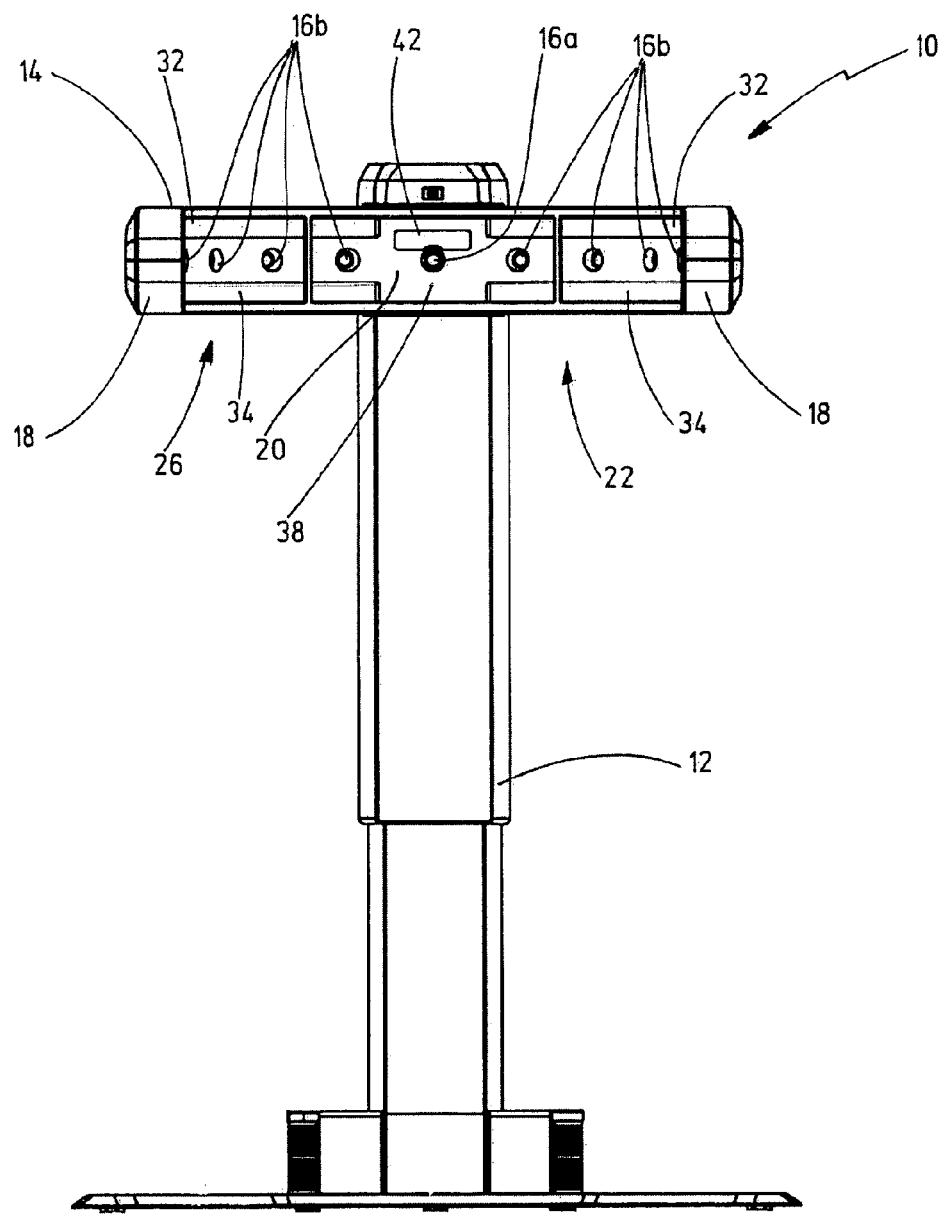
FIG. 1B shows an apparatus for determining centration parameters in a view from the front.

The apparatus 10 illustrated in the drawing serves to determine centration parameters for fitting spectacles. It has a column 12 which, in a height-adjustable manner, carries a camera carrier 14 which, in turn, carries a number of cameras 16a, 16b. In a plan view, the camera carrier 14 is bent into an approximately circular shape and it extends between two free ends 18 which are arranged at a distance from one another. An inner face 20 of the camera carrier 14 encloses an interior 22, in which the head of a subject is situated when images are recorded by the cameras 16a, 16b, to the front, i.e., towards the column 12, and to the sides. In a direction extending between the free ends 18, the inner face 20 is bent in a concave manner and it has, for example, the form of a portion of a lateral face of a cylinder, wherein a cylinder may have a circular or oval base. A lifting device, not illustrated in any more detail, is arranged in the column 12 in order to be able to position the camera carrier 14 at the correct height in relation to the head of the subject, it being possible to move the camera carrier 14 up-and-down in a motor-driven manner by way of the lifting device.

All cameras 16a, 16b are arranged in a camera arrangement 26 that extends between the free ends 18. In the present exemplary embodiment, the camera arrangement 26 is embodied as a camera row 26, the cameras 16a, 16b of which are all situated at the same height, with their optical axis being directed into the interior 22. In the present exemplary embodiment, the camera row 26 comprises a frontal camera 16a arranged in the centre of the camera carrier 14, the optical axis of the frontal camera being directed frontally onto the face of the subject, and eight lateral cameras 16b that are arranged symmetrically in pairs in respect of a perpendicular plane of symmetry extending through the optical axis of the frontal camera 16a, four of the lateral cameras being directed onto the face of the subject from the left and four being directed onto the face of the subject from the right in each case. Moreover, the cameras 16a, 16b are calibrated in such a way that they are able to record calibrated images of the subject at the same time. The calibration comprises the extrinsic properties, such as the relative alignment of the optical axes and the relative arrangement with respect to one another in space, and their intrinsic properties, i.e., the properties of the cameras themselves, which define how a point in space, which is situated in the internal coordinate system of the respective camera, is mapped onto the coordinates of the pixels of the recorded image.

The camera carrier 14 only encloses the interior 22 to the front, towards the column 12, and to the sides, i.e., to the left and right of the head of the subject. Toward the top, the bottom and toward a rear side 30, the interior is open, wherein the free ends 18 have a distance from one another of at least 25 cm such that the subject can comfortably approach from the rear side. The distance is 70 to 80 cm in the shown exemplary embodiment.

In order to illuminate the interior 22, provision is made of an illumination device having an upper light strip 32 extending above the camera row 26 and a lower light strip 34 extending below the camera row 26, the light strips having a multiplicity of LEDs as lighting means in each case. The upper light strip 32 and the lower light strip 34 each extend, continuously or with interruptions, over a length which is at least as long at the length of the length of the camera row 26 as measured in the circumferential direction between the free ends 18. This corresponds to a circumferential angle of at least 160 degrees. Near the free ends 18, the upper light strip 32 and the lower light strip 34 are connected to one another, in each case by a further light strip 36 that extends in the vertical direction. Consequently, the camera row 26 is framed in the entirety thereof by at least one row of LEDs. The apparatus 10 moreover has an open-loop or closed-loop control device, not illustrated in any more detail in the drawing, by means of which the light intensity emitted by the LEDs can be controlled or regulated depending on the light intensity detected by the cameras 16a, 16b. Here, the LEDs of the light strips 32, 34, 36 are combined into sectors, the emitted light intensities of which can be controlled or regulated separately from one another. Moreover, provision is made for the light intensities emitted by the individual LEDs also to be able to be controlled or regulated separately from one another with the open-loop or closed-loop control device.

In order to be able to correctly position the subject in the interior 22, the two lateral cameras 16b closest to the frontal camera 16a are configured to measure the distance of the head of the subject from the centre 38 of the camera carrier 14. The subject is shown whether or not they are standing correctly by means of a display unit, which is not displayed in any more detail. The display unit has a plurality of differently coloured light sources arranged in a row. The central light source lights up green when the subject stands correctly. Proceeding from the central light source, there is, in this sequence, a green, an orange and a red light source in each direction, the light sources indicating, in accordance with their colour, if the subject is slightly, clearly or much too far away from the centre 38 of the camera carrier 14 or if the subject stands slightly, clearly or much too close to the centre 38. To ensure that the recording direction of the subject is directed to infinity when determining the centration parameters, a fixation device 42 arranged at the camera carrier 14 is provided, the fixation device producing a fixation pattern in the form of a speckle pattern for the subject. The fixation pattern is arranged slightly higher than the frontal camera 16a so that the subject peers over the latter. In this way, their face can be recorded to the greatest possible extent.

The apparatus 10 is also suited, in particular, to produce an avatar of the head of the subject, which may be used for determining the centration parameters. To this end, calibrated images of the head of the subject without spectacles or spectacle frame are recorded by the cameras 16a, 16b. A depth profile of the head, which images the latter very well as an approximation, is created from the images by means of a suitable process for geometric position determination, such as triangulation. The head is imaged by a multiplicity of points which can be connected to one another with a mesh pattern or else be stored as a point cloud. In the subsequent determination of the centration parameters, the avatar thus ascertained may be used to determine centration parameters which cannot be determined, or can only be determined approximately, on account of the geometric properties of the spectacles or the spectacle frame worn by the subject. By way of example, a wide frame side may cover the eye in a lateral recording to such an extent that the vertex distance cannot be determined or can only be determined very inaccurately. Moreover, tinted or strongly reflecting spectacles may not allow the eyes to be identified, or only be identified very poorly. To counteract this, the depth profile of the avatar is projected onto the images, recorded by the cameras 16a, 16b, of the subject wearing the spectacles or spectacle frame and the centration parameters, which can only be determined very unsatisfactorily on account of the sight being restricted by the spectacles or spectacle frame, are determined by means of the image data of the avatar. Here, for the purposes of minimizing deviations, the avatar may be fitted to the images of the subject wearing the spectacles or spectacle frame.

The above-described apparatus 10 can be used as follows for both a pupil-based detection of a corneal vertex and for a reflection-based detection of a corneal vertex in both eyes of the subject.

Figure 2:
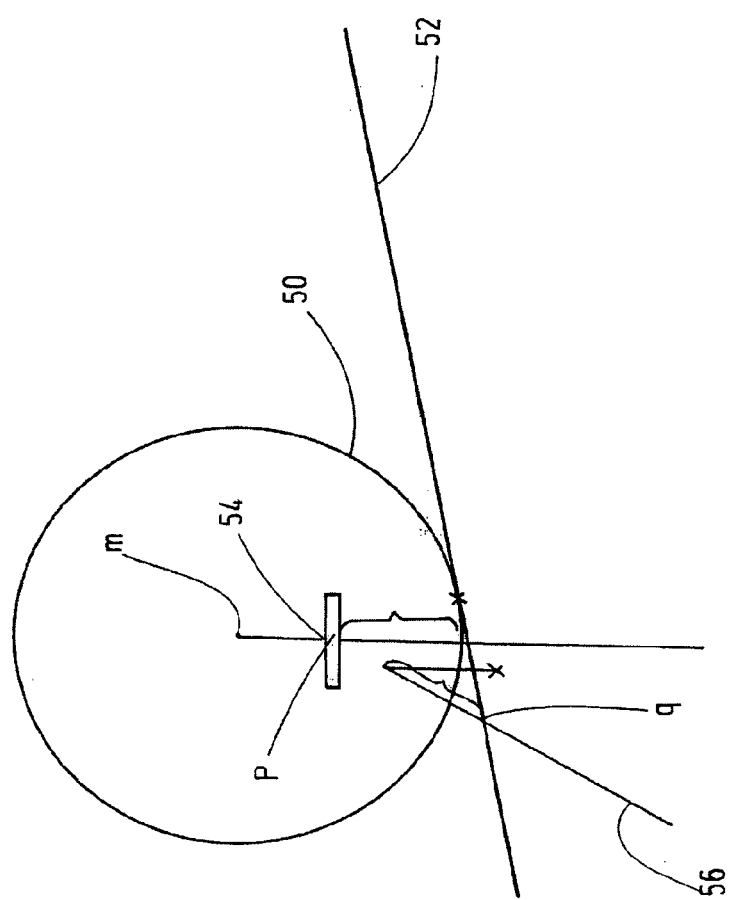
FIG. 2 shows an illustration of the correction calculation in the case of a pupil-based determination of the position of the corneal vertex.

In the pupil-based method according to FIG. 2, the position of the corneal vertex in space is initially determined to a first approximation as the point of intersection q of a first view ray 52, tangential to the cornea 50, from one of the lateral cameras 16b recording a lateral image of the subject with a second view ray 56, directed onto the pupil 54, from a frontal camera 16a recording a frontal image of the subject. A corrected position of the corneal vertex in space is calculated with a correction calculation using the equation $a=q+\mu^*v+\mu^*w$. Here, $\mu$ is an empirical value for the distance between the pupil centre and the corneal vertex, which typically assumes values between 2.5 mm and 4 mm. v is a unit vector in the spatial direction from the pupil centre p to the frontal camera 16a, the coordinates of which are specified using the variable c1, and it is calculated as $v=(p-c1)/|p-c1|$. w is a unit vector of the recording direction extending through the centre m of the corneal sphere, the recording direction being directed onto the fixation pattern of the fixation device 42 at the spatial point t, and it is calculated as $w=(t-m)/|t-m|$. All values a, q, p, c1, t, and m are three-dimensional vectors.

Figure 3A:
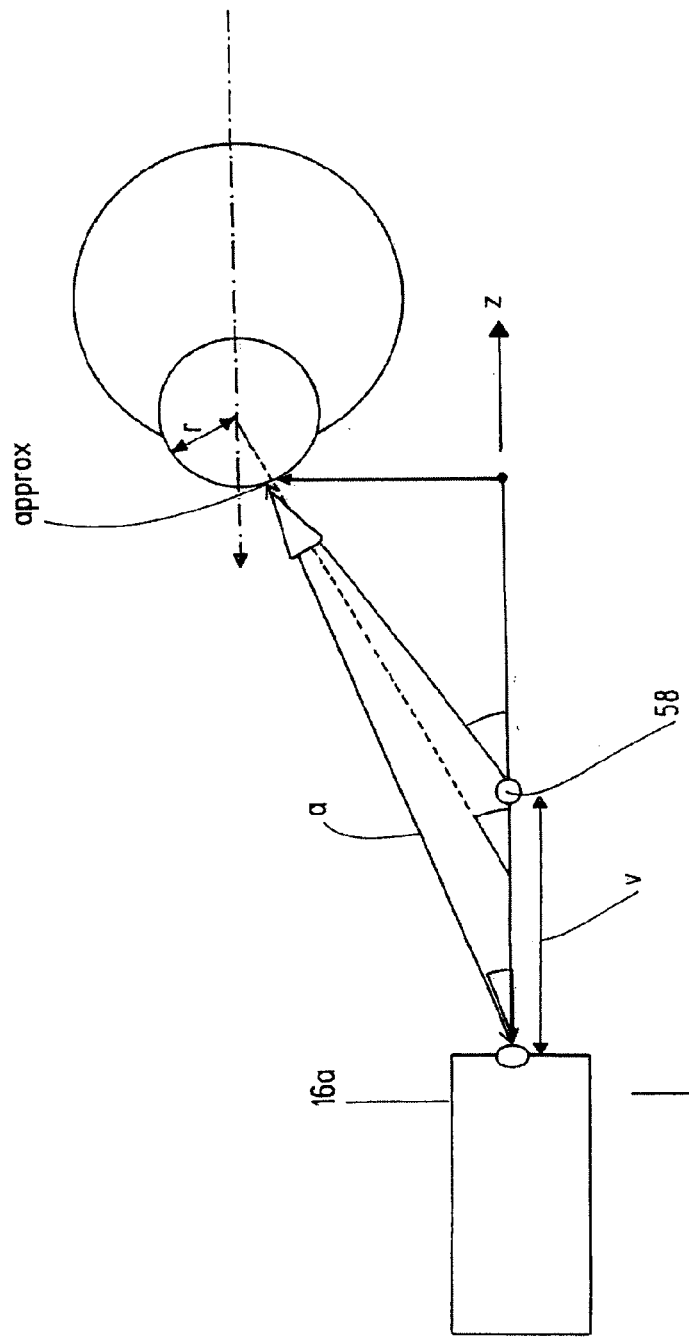
FIG. 3A shows an illustration of the correction calculation in the case of a reflection-based determination of the position of the corneal vertex relating to a correction in the x-direction.
Figure 3B:
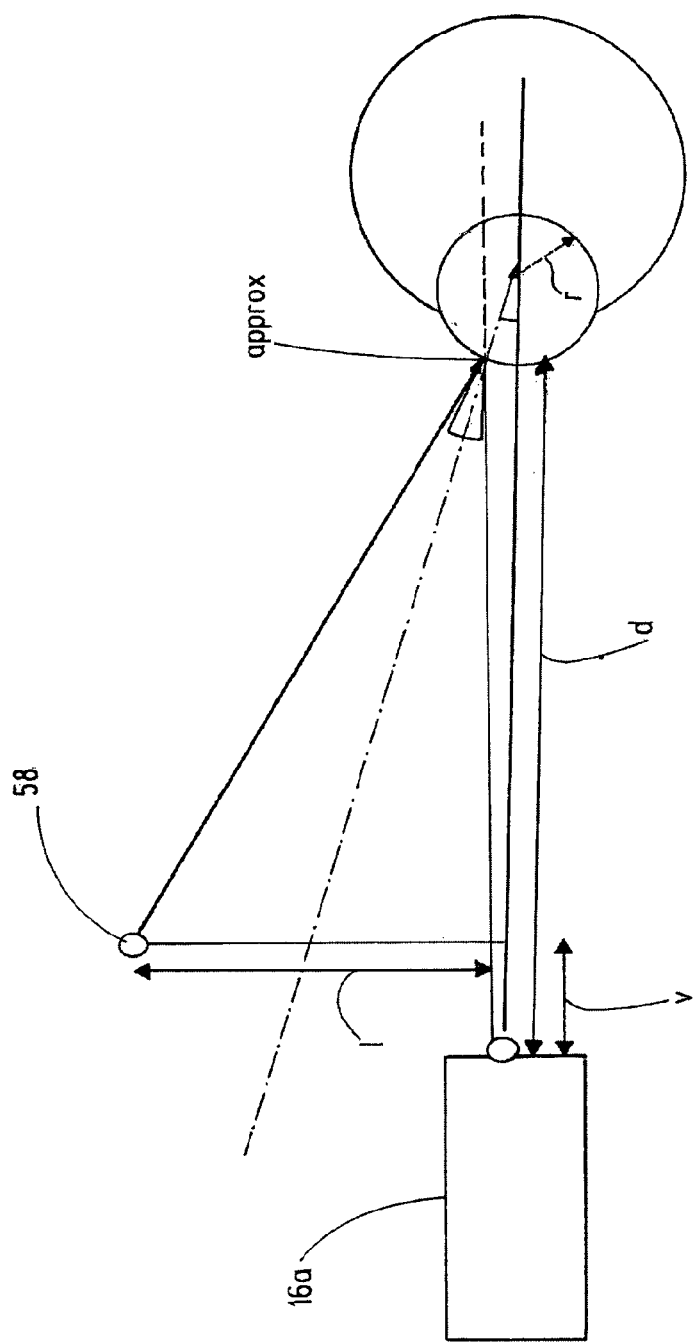
FIG. 3B shows an illustration of the correction calculation in the case of a reflection-based determination of the position of the corneal vertex relating to a correction in the y-direction.

Two correction calculations have to be undertaken in the reflection-based determination of the position of the corneal vertex according to FIGS. 3A and 3B, wherein the first correction calculation (FIG. 3A) relates to a correction in the x-direction and the second correction (FIG. 3B) relates to a correction in the y-direction. These spatial directions are set by an internal coordinate system of the frontal camera 16a, which has its origin in the optical centre of the front camera 16a. Here, the z-direction is set by the recording direction of the frontal camera 16a, the x-direction is a direction which extends horizontally and orthogonally with respect to the z-direction and which points to the right when observed in the direction of the latter, and the y-direction extends orthogonally to the x-direction and to the z-direction and points upward in space. In the case of the reflection-based measurement, a flash is emitted by means of a light source, an LED 58 in the present case, the reflection of the flash on the cornea being detected by the frontal camera 16a and at least one of the lateral cameras 16b and forming the first approximation for the position of the corneal vertex in space. In FIGS. 3A, 3B, the reflection point is denoted "approx". In the x-direction, a correction is undertaken by adding $\Delta x=+/-r^*\sin(\frac{1}{2}^*(\arccos z/a + \arctan x/(z-v)))$ to the x-coordinate of the reflection point approx, wherein the plus sign should be used in an application to the left eye and the minus sign should be used in an application to the right eye (cf. FIG. 3a). Here, r is an empirical value for the corneal radius, which is typically approximately 8 mm. a is the distance of the optical centre of the frontal camera 16a from the reflection point approx and v is the distance of the LED 58 from the optical centre of the frontal camera 16a in the z-direction. Once again, x and z are the coordinates in the x- and z-directions.

In the y-direction, a correction is undertaken by adding $\Delta y=+/-r^*\sin \frac{1}{2}^*(\arctan l/(d-v))$, proceeding from the reflection point approx. Once again, r is the empirical value for the corneal radius, d is the distance of the optical centre of the frontal camera 16a from the reflection point approx in the z-direction, v is the distance of the LED 58 from the optical centre of the frontal camera 16a in the z-direction and l is the distance of the LED 58 from the optical centre of the frontal camera 16a in the y-direction. The plus sign is used when the LED 58 is arranged below the frontal camera 16a, i.e., if the y-coordinate of the LED 58 is smaller than the y-coordinate of the frontal camera 16a or of the optical centre of the latter. The minus sign is used if the LED is arranged above the frontal camera 16a.

In the above-described method, the pupil or the reflection point approx can be detected, for example, by means of feature extraction and/or feature matching and/or by means of machine learning by comparison with a multiplicity of data known in advance. This detection step can be preceded by a step in which a face detector identifies which pixels belong to the face of the subject or to their eye area such that there can already be a restricted search for the pupil or the reflection point approx.

Figure 4A:
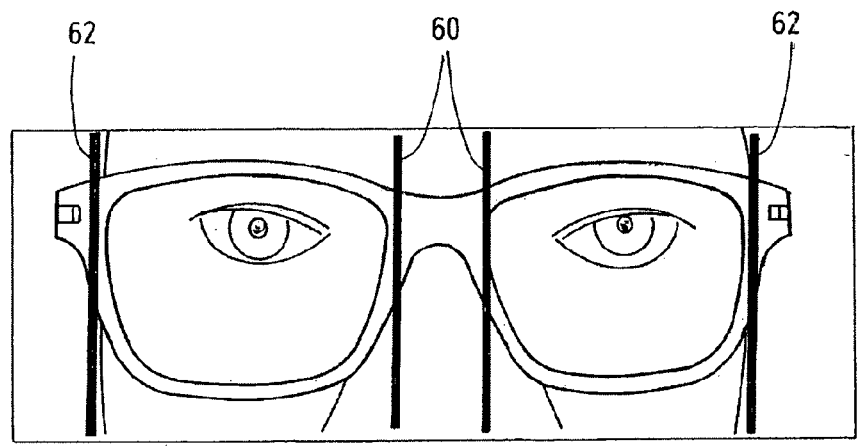
FIG. 4A shows a view from the front of a head wearing spectacles with approximated frame edges projected thereon.
Figure 4B:
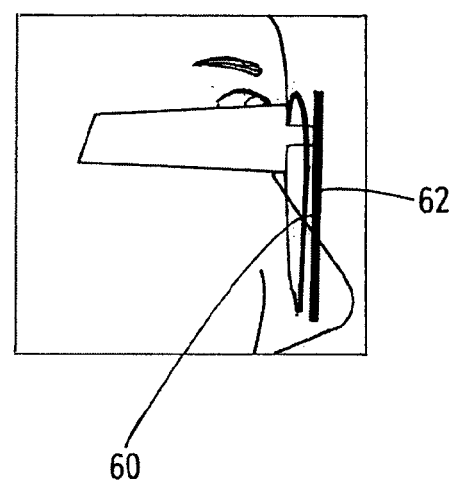
FIG. 4B shows a view from the side of a head wearing spectacles with approximated frame edges projected thereon.
Figure 5:
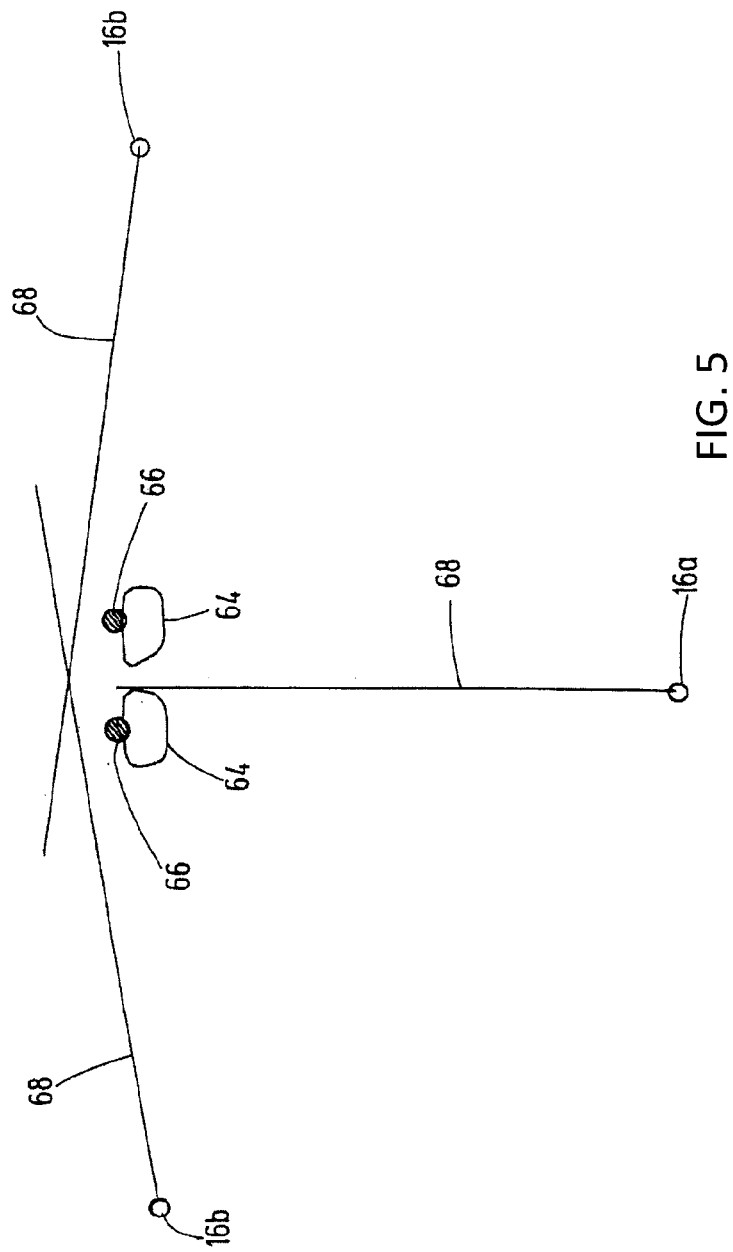
FIG. 5 shows a schematic illustration of approximately determined lens planes.

The position of the corneal vertex in space is used for determining the centration parameters when fitting the spectacles. By means of the calibrated images recorded by the cameras 16a, 16b, geometric parameters describing the geometry of the spectacle frame are ascertained by geometric position determination, in particular by triangulation or epipolar geometry. The parameters comprise the nasal and temporal frame edges 60, 62, as indicated in FIGS. 4A and 4B in exemplary fashion. Planes 64 are fitted to the parameters describing the nasal and temporal frame edges 60, 62, as an approximation for the surfaces of the spectacle lenses to be received in the spectacle frame. FIG. 5 schematically shows the planes 64 in front of the respective, approximately represented cornea 66 with schematically illustrated visual beams 68 of the cameras 16a, 16b. Finally, the centration parameters are calculated from the data obtained.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-implemented method for determining centration parameters, the method comprising:
   providing at least two images of a head of a subject wearing a spectacle frame, the at least two images being calibrated to one another and recorded from different recording directions;
   ascertaining geometric parameters describing a position of eyes of the subject from the at least two images by geometric position determination;
   fitting a three-dimensional model for spectacle lenses to be received in a spectacle frame to geometric parameters describing a geometry of the spectacle frame, wherein at least one of planes or linear combinations of surfaces of n-th order are fitted to the geometric parameters) describing the geometry of the spectacle frame as an approximation for the surfaces of the spectacle lenses to be received in the spectacle frame;
   calculating centration parameters from the geometric parameters describing the position of the eyes, the geometric parameters describing the geometry of the spectacle frame, and the three-dimensional model,
   wherein the geometric parameters describing the position of the eyes include a position of a corneal vertex in space; and determining the position of the corneal vertex in space to a first approximation as a point of intersection q of a first view ray, tangential to the cornea, from a lateral camera recording the lateral image with a second view ray, directed onto the pupil, from a frontal camera recording the frontal image.

2. The computer-implemented method according to claim 1, wherein the surfaces of n-th order comprise a plane, a paraboloid, or the plane and the paraboloid.

3. The computer-implemented method according to claim 1, wherein a plane is respectively fitted to the parameters describing the geometry of the spectacle frame as an approximation for the surface of each of the spectacle lenses to be received in the spectacle frame or each spectacle frame edge receiving the spectacle lenses.

4. The computer-implemented method according to claim 1, wherein the at least two images are recorded at a same time.

5. The computer-implemented method according to claim 1, wherein the geometric parameters describing the geometry of the spectacle frame include parameters describing nasal and/or temporal frame edges approximated by straight lines, and
wherein the three-dimensional model is fitted to the parameters describing the nasal and/or temporal frame edges.

6. The computer-implemented method according to claim 1, further comprising:
providing at least three images of the head of the subject wearing the spectacle frame, the at least three images being calibrated to one another and recorded at a same time from different recording directions, wherein a frontal image images the head from a front side, a left lateral image images the head from a left side, and a right lateral image images the head from a right side.

7. The computer-implemented method according to claim 6, wherein the recording directions of the left and right lateral images each include an angle of more than 60 degrees and no more than 120 degrees with the recording direction of the frontal image.

8. The computer-implemented method according to claim 1, wherein the at least two images do not overlap or wherein the centration parameters are determined only from non-overlapping regions of the at least two images.

9. The computer-implemented method according to claim 1, further comprising:
performing a correction calculation of the position of the corneal vertex.

10. A computer-implemented method for determining centration parameters, the method comprising:
providing at least two images of a head of a subject wearing a spectacle frame, the at least two images being calibrated to one another and recorded from different recording directions;
ascertaining geometric parameters describing a position of eyes of the subject from the at least two images by geometric position determination;
fitting a three-dimensional model for spectacle lenses to be received in a spectacle frame to geometric parameters describing a geometry of the spectacle frame, wherein at least one of planes or linear combinations of surfaces of n-th order are fitted to the geometric parameters) describing the geometry of the spectacle frame as an approximation for the surfaces of the spectacle lenses to be received in the spectacle frame;
calculating centration parameters from the geometric parameters describing the position of the eyes, the geometric parameters describing the geometry of the spectacle frame, and the three-dimensional model,
wherein the geometric parameters describing the position of the eyes include a position of a corneal vertex in space, and
wherein the correction calculation comprises calculating the corneal vertex according to $a = q + \mu^* v + \mu^* w$, where a denotes the position vector of the corneal vertex in space after carrying out the correction calculation, q denotes the position of the corneal vertex to a first approximation, $\mu$ denotes an empirical value or an actual value for the distance between the pupil centre and the corneal vertex, v denotes a unit vector in the spatial direction from the pupil centre to the frontal camera, and w denotes a unit vector in the recording direction extending through the centre of a corneal sphere.

11. A computer-implemented method for determining centration parameters, the method comprising:
providing at least two images of a head of a subject wearing a spectacle frame, the at least two images being calibrated to one another and recorded from different recording directions;
ascertaining geometric parameters describing a position of eyes of the subject from the at least two images by geometric position determination;
fitting a three-dimensional model for spectacle lenses to be received in a spectacle frame to geometric parameters describing a geometry of the spectacle frame, wherein at least one of planes or linear combinations of surfaces of n-th order are fitted to the geometric parameters describing the geometry of the spectacle frame as an approximation for the surfaces of the spectacle lenses to be received in the spectacle frame;
calculating centration parameters from the geometric parameters describing the position of the eyes, the geometric parameters describing the geometry of the spectacle frame, and the three-dimensional model;
producing a flash when recording the images; and
determining the position of the corneal vertex in space to a first approximation as the position of the reflection point of the flash on the cornea.

12. A computer-implemented method for determining centration parameters, the method comprising:
providing at least two images of a head of a subject wearing a spectacle frame, the at least two images being calibrated to one another and recorded from different recording directions;
ascertaining geometric parameters describing a position of eyes of the subject from the at least two images by geometric position determination;
fitting a three-dimensional model for spectacle lenses to be received in a spectacle frame to geometric parameters describing a geometry of the spectacle frame, wherein at least one of planes or linear combinations of surfaces of n-th order are fitted to the geometric parameters describing the geometry of the spectacle frame as an approximation for the surfaces of the spectacle lenses to be received in the spectacle frame; and
calculating centration parameters from the geometric parameters describing the position of the eyes, the geometric parameters describing the geometry of the spectacle frame, and the three-dimensional model,
wherein the geometric parameters describing the position of the eyes include a position of a corneal vertex in space, wherein the position of the corneal vertex in a horizontal direction proceeding from the reflection point is calculated with the correction calculation by adding $\Delta x = +/- r^* \sin(\frac{1}{2}^*(\arccos z/a + \arctan x/(z-v)))$ to the x-coordinate, where r denotes an empirical value or an actual value for the corneal radius, a denotes the distance between the optical centre of a frontal camera recording the frontal image and the reflection point, x and z denote the x- and z-coordinates of the reflection point in a coordinate system with the origin at the optical centre of the frontal camera, and wherein the recording direction of the frontal camera corresponds to the z-direction and the x-direction is horizontally orthogonal to the z-direction and, when observed in the z-direction, points to the right, and v denotes the distance between the light source producing the flash and the optical centre of the frontal camera in the z-direction.

13. A computer-implemented method for determining centration parameters, the method comprising:
   providing at least two images of a head of a subject wearing a spectacle frame, the at least two images being calibrated to one another and recorded from different recording directions;
   ascertaining geometric parameters describing a position of eyes of the subject from the at least two images by geometric position determination;
   fitting a three-dimensional model for spectacle lenses to be received in a spectacle frame to geometric parameters describing a geometry of the spectacle frame, wherein at least one of planes or linear combinations of surfaces of n-th order are fitted to the geometric parameters) describing the geometry of the spectacle frame as an approximation for the surfaces of the spectacle lenses to be received in the spectacle frame; and
   calculating centration parameters from the geometric parameters describing the position of the eyes, the geometric parameters describing the geometry of the spectacle frame, and the three-dimensional model,
   wherein the geometric parameters describing the position of the eyes include a position of a corneal vertex in space,
   wherein the position of the corneal vertex in the y-direction proceeding from the reflection point is calculated with the correction calculation by adding $\Delta y = +/- r^* \sin \frac{1}{2}^*(\arctan 1/(d-v))$, where r denotes an empirical value or an actual value for the corneal radius, d denotes the distance between the optical centre of the frontal camera and the reflection point in the z-direction, v denotes the distance between the light source producing the flash and the optical centre of the frontal camera in the z-direction and l denotes the distance between the light source and the optical centre of the frontal camera in the y-direction, and wherein the y-direction is orthogonal to the x-direction and to the z-direction and points upward in space.

14. A computer program stored on a non-transitory storage medium with program code for carrying out the method according to claim 1 when the computer program is loaded onto a computer and/or executed on the computer.

15. A method of operating an apparatus for carrying out the computer-implemented method according to claim 1, wherein the apparatus has a camera carrier configured to partly enclose an interior that is open to the top, to the bottom, and to a rear side,
   wherein the camera carrier carries at least three cameras that are arranged between two free ends of the camera carrier and directed toward the interior, and
   wherein the camera carrier has an illumination device configured to illuminate the interior.

16. A method for centring at least one spectacle lens in a spectacle frame, the method comprising:
   determining centration parameters of the at least one spectacle lens with the method according to claim 1; and
   centring the at least one spectacle lens in the spectacle frame with the determined centration parameters.

17. A method for grinding at least one spectacle lens into a spectacle frame, wherein centration parameters are determined with the method according to claim 1, and
   wherein the at least one spectacle lens is ground on the basis of the determined centration parameters for an arrangement in the spectacle frame.

18. A method for producing a spectacle lens comprising:
   grinding the spectacle lens into a spectacle frame according to the method of claim 17.

19. A method for producing spectacles, the method comprising:
   centring at least one spectacle lens in a spectacle frame according to the method of claim 16.

20. An apparatus for determining centration parameters for fitting spectacle lenses to a given spectacle frame and to a head of a subject, the apparatus comprising:
   a first camera configured to record a first image from a first viewing direction;
   at least one second camera, calibrated to the first camera, configured to record a second image from a second viewing direction that differs from the first viewing direction; and
   a computer having a processor configured to execute a computer program and a non-transitory memory in which the computer program is stored, the computer program having program code that, when executed by the processor, causes the apparatus to:
      provide at least two images of the head of a subject wearing a spectacle frame, which are calibrated to one another and recorded from different viewing directions,
      ascertain geometric parameters describing the position of the eyes and geometric parameters describing the geometry of the spectacle frame, from the images by geometric position determination,
      fit a three-dimensional model for spectacle lenses to be received in a spectacle frame to geometric parameters describing a geometry of the spectacle frame, wherein at least one of planes or linear combinations of surfaces of n-th order are fitted to the geometric parameters describing the geometry of the spectacle frame as an approximation for the surfaces of the spectacle lenses to be received in the spectacle frame;
      calculate centration parameters from the geometric parameters describing the position of the eyes, the geometric parameters describing the geometry of the spectacle frame, and the three-dimensional model,
      wherein the geometric parameters describing the position of the eyes include a position of a corneal vertex in space; and
      determine the position of the corneal vertex in space to a first approximation as a point of intersection q of a first view ray, tangential to the cornea, from a lateral camera recording the lateral image with a second view ray, directed onto the pupil, from a frontal camera recording the frontal image.

21. A computer program stored on a non-transitory storage medium with program code for carrying out the method according to claim 10 when the computer program is loaded onto a computer and/or executed on the computer.

22. A computer program stored on a non-transitory storage medium with program code for carrying out the method according to claim 11 when the computer program is loaded onto a computer and/or executed on the computer.

23. A computer program stored on a non-transitory storage medium with program code for carrying out the method according to claim 12 when the computer program is loaded onto a computer and/or executed on the computer.

24. A computer program stored on a non-transitory storage medium with program code for carrying out the method according to claim 13 when the computer program is loaded onto a computer and/or executed on the computer.

25. An apparatus for determining centration parameters for fitting spectacle lenses to a given spectacle frame and to a head of a subject, the apparatus comprising:
 a first camera configured to record a first image from a first viewing direction;
 at least one second camera, calibrated to the first camera, configured to record a second image from a second viewing direction that differs from the first viewing direction; and
 a computer having a processor configured to execute a computer program and a non-transitory memory in which the computer program is stored, the computer program having program code that, when executed by the processor, causes the apparatus to perform the method according to claim 10.

26. An apparatus for determining centration parameters for fitting spectacle lenses to a given spectacle frame and to a head of a subject, the apparatus comprising:
 a first camera configured to record a first image from a first viewing direction;
 at least one second camera, calibrated to the first camera, configured to record a second image from a second viewing direction that differs from the first viewing direction; and
 a computer having a processor configured to execute a computer program and a non-transitory memory in which the computer program is stored, the computer program having program code that, when executed by the processor, causes the apparatus to perform the method according to claim 11.

27. An apparatus for determining centration parameters for fitting spectacle lenses to a given spectacle frame and to a head of a subject, the apparatus comprising:
 a first camera configured to record a first image from a first viewing direction;
 at least one second camera, calibrated to the first camera, configured to record a second image from a second viewing direction that differs from the first viewing direction; and
 a computer having a processor configured to execute a computer program and a non-transitory memory in which the computer program is stored, the computer program having program code that, when executed by the processor, causes the apparatus to perform the method according to claim 12.

28. An apparatus for determining centration parameters for fitting spectacle lenses to a given spectacle frame and to a head of a subject, the apparatus comprising:
 a first camera configured to record a first image from a first viewing direction;
 at least one second camera, calibrated to the first camera, configured to record a second image from a second viewing direction that differs from the first viewing direction; and
 a computer having a processor configured to execute a computer program and a non-transitory memory in which the computer program is stored, the computer program having program code that, when executed by the processor, causes the apparatus to perform the method according to claim 13.

* * * * *

UNITED STATES PATENT AND TRADEMARK OFFICE
CERTIFICATE OF CORRECTION

PATENT NO. : 11,480,816 B2
APPLICATION NO. : 17/105980
DATED : October 25, 2022
INVENTOR(S) : Claudia Nieuwenhuis and Oliver Schwarz It is certified that error appears in the above-identified patent and that said Letters Patent is hereby corrected as shown below:

In the Claims

In Claim 10, Column 9, Lines 62 to 63, change "parameters)" to – parameters –

In Claim 13, Column 11, Lines 31 to 32, change "parameters)" to – parameters –

Signed and Sealed this
Twentieth Day of December, 2022

Katherine Kelly Vidal
*Director of the United States Patent and Trademark Office*